US006574016B1

(12) United States Patent
Harley et al.

(10) Patent No.: US 6,574,016 B1
(45) Date of Patent: Jun. 3, 2003

(54) METHOD AND APPARATUS FOR ANCILLARY DATA IN A WAVELENGTH DIVISION MULTIPLEXED SYSTEM

(75) Inventors: James St. Leger Harley, Ottawa (CA); Ping Wan, Ottawa (CA); Paul Alan Bruce, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/199,327

(22) Filed: Nov. 25, 1998

(51) Int. Cl.[7] .............................................. H04T 14/02
(52) U.S. Cl. ........................ 359/124; 359/110; 359/181
(58) Field of Search ................................. 359/124, 181, 359/184, 110

(56) References Cited

U.S. PATENT DOCUMENTS

| | | | | |
|---|---|---|---|---|
| 5,390,185 A | * | 2/1995 | Hooijmans et al. | 359/187 |
| 5,798,857 A | * | 8/1998 | Tamura et al. | 359/179 |
| 5,995,256 A | * | 11/1999 | Fee | 359/125 |
| 6,108,113 A | * | 8/2000 | Fee | 359/124 |

OTHER PUBLICATIONS

"Transmission Capacity of Optical Path Overhead Transfer Scheme Using Pilot Tone for Optical Path Network", Y. Hamazumi et al., Journal of Lightwave Technology, vol. 15, No. 12, IEEE, New York, Dec. 1, 1997, pp. 2197–2205.
"Signal Tracking and Performance Monitoring in Multi--Wavelength Optical Networks", F. Heismann et al., Proc. of the European Conference on Optical Communication, Oslo, 1996, pp. 47–50.
"Performance Analysis of Multiple Subcarrier Encoding of Packet Headers in Quasi–All–Optical WDM Networks", P. Poggiolini et al., IEEE Photonics Technology Letters, vol. 6, No. 1, IEEE, New York, 1994, pp. 112–114.
"Subcarrier Multiplexing of Packet Headers in a WDM Optical Network and a Novel Ultrafast Header Clock–Recovery Technique", M. Cerisola et al., Optical Fiber Communication, Summaries of papers presented at the OFC Conference, IEEE, San Diego, Feb. 26, 1995, pp. 273–274.
"Photonic Transport Network Architecture and OA&M Technologies to Create Large–Scale Robust Networks", S. Okamoto, IEEE Journal on Selected Areas in Communications, vol. 16, No. 7, IEEE, New York, Sep. 1, 1998, pp. 995–1007.

* cited by examiner

*Primary Examiner*—Kinfe-Michael Negash
(74) *Attorney, Agent, or Firm*—Angela C. de Wilton

(57) ABSTRACT

This invention provides method and apparatus for ancillary data in a wavelength division multiplexed (WDM) system. According to the invention, a low bit rate channel is provided over a amplitude modulated sub-carrier that is in turn used to amplitude intensity modulate an optical data signal that is output from a transmitter in the network. Data carried by the low bit rate channel can by used by another network element (NE) to determine the identity of the channel source, thereby allowing the NE to verify its connectivity to that source via the network. This invention is particularly useful in metropolitan optical networks (MON) where inexpensive methods of determining network connectivity are required.

54 Claims, 3 Drawing Sheets

METHOD AND APPARATUS FOR ANCILLARY DATA IN A WAVELENGTH DIVISION MULTIPLEXED SYSTEM

FIELD OF THE INVENTION

This invention relates to wavelength division multiplexed (WDM) optical systems, and more particularly to method and apparatus for a dense WDM (DWDM) optical system.

BACKGROUND OF THE INVENTION

In optical transmission systems the capability to determine the connectivity of network elements (NE) is important in performing equipment inventory management, fault isolation, and automated provisioning of the system. In a DWDM system, which typically carries 33 or more multiplexed channels of information over a single fiber, this capability would normally require an optical demultiplexer in each NE in order to access the information carried by the channels. This information would then be used to determine the connectivity of the NE. However, optical demultiplexers are relatively expensive components, and therefore, to include them in an NE solely for determining the connectivity of the NE where they otherwise would not be required is undesirable. It appears then, that an alternative technique of providing the capability to determine the connectivity of an NE would be useful.

SUMMARY OF THE INVENTION

An object of the present invention is to provide improved method and apparatus for ancillary data in a WDM optical transmission system.

The present invention provides a low bit rate data channel for carrying ancillary data between a channel wavelength source and an optical NE in a WDM system. The low bit rate data channel, hereinafter called a WaveID, is carried by a sub-carrier frequency signal that has been modulated by the ancillary data. The modulated sub-carrier frequency signal is used to modulate an optical data; signal. The WaveID of each channel is orthogonal to other WaveIDs. That is, for an optical signal that is comprised of a plurality of modulated optical data signals that are each of a different channel wavelength, each WaveID can be detected independently from other WaveIDs.

According to one embodiment of the present invention each WaveID can carry ancillary data that includes channel source identification information, such as a unique channel identifier that uniquely identifies the wavelength source. Further to this end, the WaveID could carry such ancillary data as: Internet protocol (IP) address of the source, physical location identifier of the source, working or protection channel identification, payload format and bit rate identifiers, and other such information as dictated by future requirements.

The WaveIDs can be detected by an NE equipped with a tap coupler, a photo detector, and a WaveID detector. By tapping an incoming optical signal: and detecting the set of WaveIDs present, an NE can determine the wavelength sources to which it is connected via the network. This allows the NE to verify or discover its connectivity to the network. This capability is particularly attractive for Metro Optical Networks (MON) where inexpensive techniques of optical connectivity verification are required.

An advantage of the present invention is that it does not require optical demultiplexing of the channel wavelengths in order to identify the channel wavelength sources. Consequently, adding optical demultiplexors in order to perform channel source identification is not necessary. This leads to a relatively inexpensive technique of channel source identification that is useful in determining the connectivity of an NE in a DWDM system.

According to an aspect of the present invention there is provided an apparatus for ancillary data in a wavelength division multiplexed system comprising: a modulator for modulating a sub-carrier frequency signal with the ancillary data; an intensity modulator for amplitude intensity modulating an optical data signal: with the modulated sub-carrier frequency signal; al tap coupler for tapping a portion of the amplitude intensity modulated optical signal; an opto-electronic convertor for converting the tapped portion of the optical signal to an electrical signal; and a detector for detecting the modulated sub-carrier frequency signal from the electrical signal, and for detecting the ancillary data from the modulated sub-carrier frequency signal.

According to another aspect of the present invention there is provided an encoder for ancillary data in a wavelength division multiplexed system comprising: a modulator for modulating a sub-carrier frequency signal with the ancillary data; and an intensity modulator for amplitude intensity modulating an optical data signal with the modulated sub-carrier frequency signal.

According to another aspect of the present invention there is provided a decoder for extracting ancillary data from an optical data signal that has been amplitude intensity modulated by a modulated sub-carrier frequency signal that has been modulated by the ancillary data in a wavelength division multiplexed system, comprising: a tap coupler for tapping a portion of the modulated optical data signal; an opto-electronic convertor for converting the tapped portion to an electrical signal; and a detector for detecting the modulated sub-carrier frequency signal from the electrical signal, and for detecting the ancillary data from the modulated sub-carrier frequency signal.

According to yet another aspect of the present invention there is provided a method of identifying channel sources in a wavelength division multiplexed system comprising the steps of: at a first node in the system, modulating a sub-carrier frequency signal with the ancillary data; at the first node, amplitude intensity modulating an optical data signal with the modulated sub-carrier frequency signal; at the first node, transmitting the modulated optical data signal onto an optical fiber; at a second node in the system, tapping a portion of the modulated optical data signal from the optical fiber; at the second node, converting the tapped portion to an electrical signal; at the second node, detecting the modulated sub-carrier frequency signal from the electrical signal; and at the second node, detecting the ancillary data from the modulated sub-carrier frequency signal.

According to still another aspect of the present invention there is provided an amplitude intensity modulated optical signal for conveying ancillary data in a wavelength division multiplexed system comprising:

pulse modulated light of a constant wavelength that has been modulated at a first bit rate by a first sequence of data symbols; and an amplitude intensity modulation of the pulse modulated light at a sub-carrier frequency that is less than the bit rate of the optical data signal divided by two and where the sub-carrier frequency has been modulated by ancillary data represented by a second sequence of data symbols, wherein the second sequence of data symbols has a bit rate that is at least eight orders of magnitude lower than the first bit rate.

According to still another aspect of the present invention there is provided an apparatus for ancillary data in a wavelength division multiplexed system comprising: a data source for providing the ancillary data wherein the ancillary data includes channel source identifying information; and means for including the ancillary data in an optical data signal, wherein the optical data signal is amplitude intensity modulated by a signal that has been modulated by the ancillary data.

BRIEF DESCRIPTION OF THE DRAWINGS

The invention will be better understood from the following description with reference to the drawings in which.

and

Figure 1:
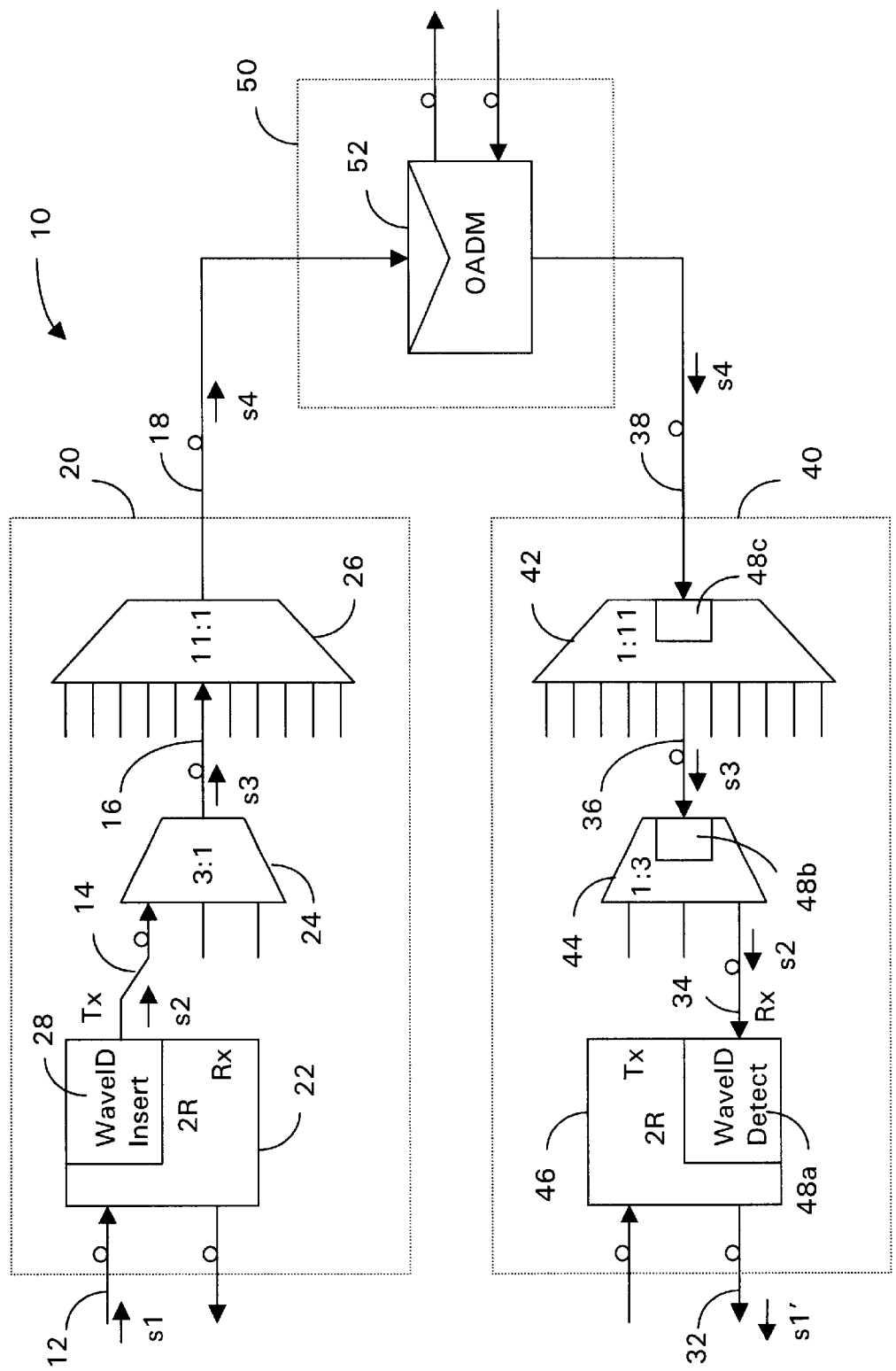
FIG. 1 is a block diagram of a MON in accordance with an embodiment of the present invention.
Figure 3:
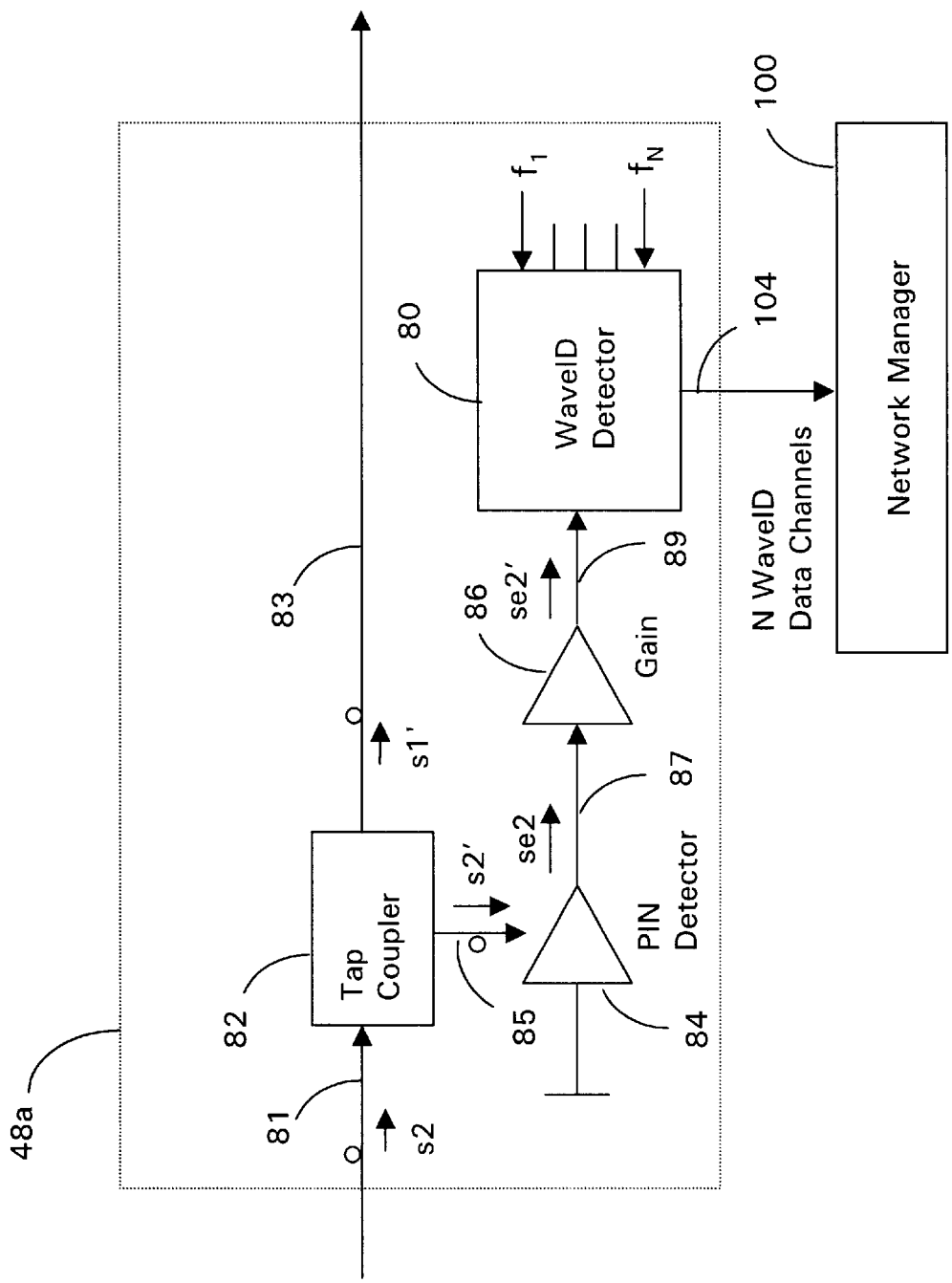

FIG. 3 is a block diagram of the WaveID detection block of FIG. 1.

DETAILED DESCRIPTION

In FIG. 1 there is illustrated in a block diagram a MON 10 in accordance with an embodiment of the present invention. The MON 10 includes optical transmission equipment at a first site 20, at a second site 40, and at a third site 50. The equipment at the first site 20 includes a 2R transceiver 22, a 3:1 multiplexor 24 coupled to the transceiver 22 via an optical fiber 14, and an 11:1 multiplexor 26 coupled to the multiplexor 24 via an optical fiber 16. The transceiver 22 is equipped with WaveID insertion apparatus 28.

In operation, an optical data signal s1 is input to the transceiver 22 via an optical fiber 12. The WaveID insertion apparatus 28 inserts the WaveID into the signal s1, and a modulated optical data signal s2 is output on the optical fiber 14. The multiplexor 24 multiplexes the signal s2 with two other signals (not shown), which are similar to the signal s2 in format but are of different channel wavelengths, and outputs a multiplexed signal s3 onto the optical fiber 16. The multiplexor 26 multiplexes the signal s3 with ten other multiplexed signals (not shown), which are similar to the multiplexed signal s3 in format but are again of different channel wavelengths, then outputs a multiplexed signal s4 onto the optical fiber 18. Consequently, the multiplex signal s4 is composed of thirty-three signals, each signal of a different channel wavelength, and the WaveID of each channel uniquely identifying its respective channel source.

The third site 50 includes an optical add drop multiplexor (OADM) 52. The OADM 52 is connected to the multiplexor 26 of the first site 20 via the optical fiber 18 and to the second site 40 via an optical fiber 38.

The OADM 52 is capable of extracting, or dropping, channels from the signal s4. Further, the OADM 52 can add channels in the place of dropped channels, or it can simply copy information carried by any of the channels and thereby allow the signal: s4 to effectively passthrough the OADM 52.

For simplicity, FIG. 1 shows the signal s4 passing; through the OADM 52.

The second site 40 comprises a 1:11 demultiplexor 42 connected to the third site 50 via the optical fiber 38, a 1:3 demultiplexor 44 connected to the demultiplexor 42 via an optical fiber 36, and a 2R transceiver 46 connected to the demultiplexor 44 via an optical fiber 34. The transceiver 46 is equipped with WaveID detection apparatus 48a. The demultiplexors 42 and 44 are also shown equipped with WaveID detection apparatus 48b and 48c, respectively.

In operation, the multiplexed signal s4 is input to the demultiplexor 42 on the optical fiber 38. The signal s3 is output from the demultiplexor 42 on the optical fiber 36 and input to the demultiplexor 44. The modulated optical data signal s2 is output from the demultiplexor 44 on the optical fiber 34 and input to the transceiver 46. The WaveID detection apparatus 48a, 48b , and 48c can be used in order to detect the WaveIDs on their respective input signals s2, s3, and s4, and thereby to determine wavelength source information of the channels. The transceiver 46 outputs an optical data signal s1' onto an optical fiber 32. The signal s1' includes the information contained in the signal s1 and the WaveID of the signal s2.

It should be noted, that there would be a plurality of transceivers 28 and 46 at the first and second sites, respectively, however these transceivers have been omitted for clarity. Further, it should be noted that the WaveID detection apparatus could be located in any of the NEs 22, 24, 26, 52, 42, 44, and 46 shown in FIG. 1. This would allow each NE to determine its connectivity to the network by determining the wavelength source information from the WaveIDs of the channels that it is receiving. In addition, a piece of equipment for managing the network, often referred to as a network manager, which is in communication with each NE in the network, could determine the connectivity of the network from the wavelength source information of the channels that each NE is receiving.

Figure 2:
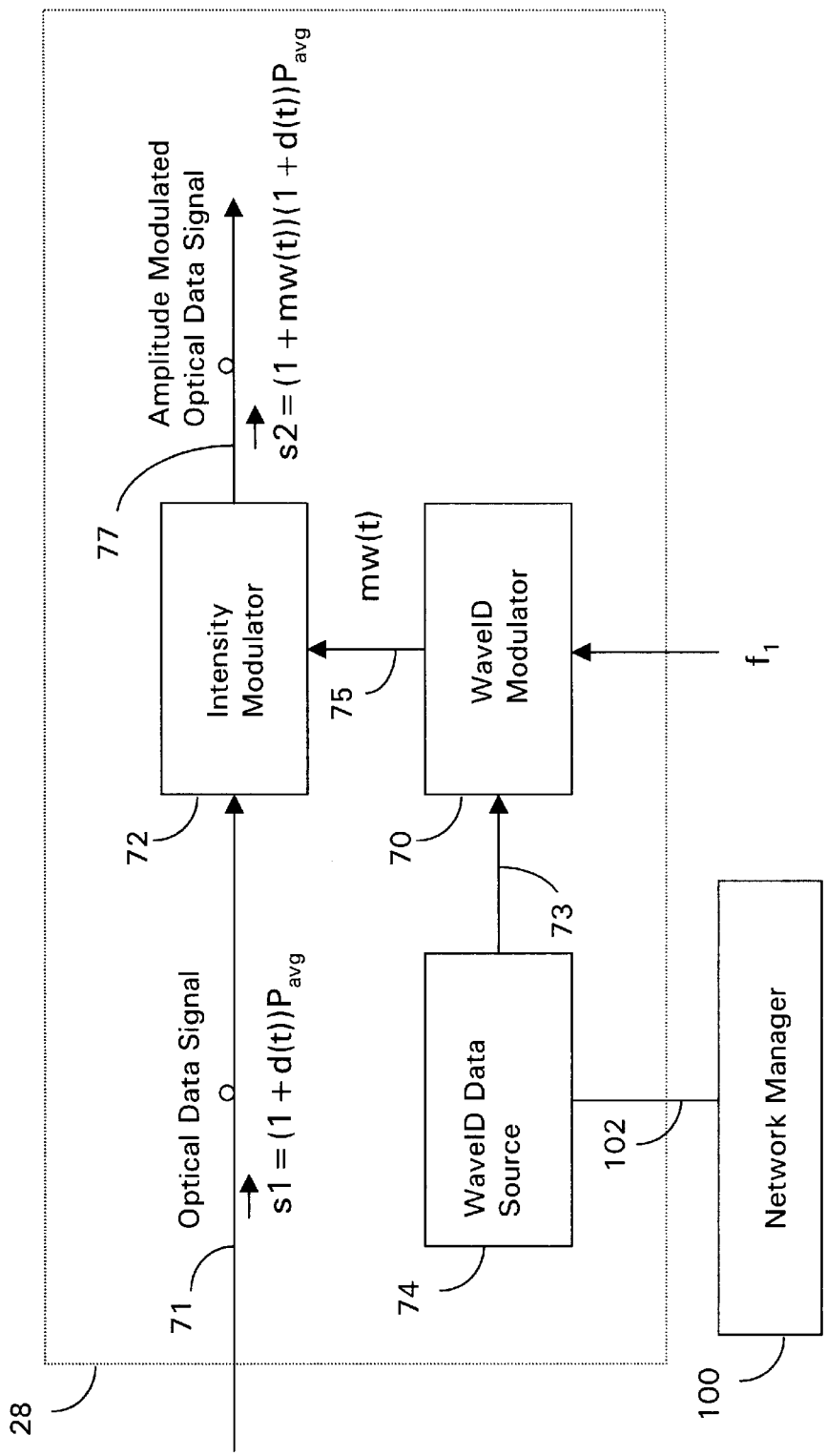
FIG. 2 is a block diagram of the WaveID insertion block of FIG. 1.

In FIG. 2 there is illustrated in a block diagram the WaveID insertion apparatus 28 of FIG. 1. The WaveID insertion apparatus 28 includes a WaveID data source 74, a WaveID modulator 70 coupled to the WaveID data source 74 via a link 73 and having an, input for a sub-carrier frequency signal of frequency f1, and an intensity modulator 72 coupled to the WaveID modulator 70 via a link 75. An optical fiber 71 is connected to the input of the intensity modulator 72, and at its output there is connected an optical fiber 77. A network manager 100 is shown communicatively coupled to the WaveID data source 74 via a link 102.

In operation, ancillary data to be carried by the WaveID is provided by the WaveID data source 74, and optionally the network manager 100. The ancillary data includes channel source identification information such as: IP address of the source, physical location of the source, working or protection channel identification, payload format and bit rate, and other such information as dictated by future requirements. The ancillary data is provided to the WaveID modulator 70. The WaveID modulator 70 modulates the sub-carrier frequency signal of frequency f1 with the ancillary data at a bit rate that is at least eight orders of magnitude ($10^8$) lower than the bit rate of the optical data signal s1. The sub-carrier frequency signal is amplitude modulated by the data to a given modulation depth m. The sub-carrier frequency signal has a frequency f1 that less that than bit rate of the optical data signal s1 divided by two. That is, the sub-carrier frequency signal is an in-band sub-carrier with respect to the optical data signal si. The resultant signal mw(t) is input to the intensity modulator 72 via the link 75. The optical data signal s1, which can be represented by (1+d(t))Pavg, where d(t) is the time varying data and Pavg represents the average optical power, is input to the intensity modulator 72 via the optical fiber 71. The optical data signal s1 is intensity amplitude modulated according to the signal mw(t) by the intensity modulator 72. The resulting modulated optical data signal s2, which can be represented by (1+wm(t))(1+d(t)) Pavg, is output on the optical fiber 77. Thus, the signal s2 includes data of the type described earlier, the data being carried by the WaveID. Typically, the data would have a bit rate in the range of one to ten bits per second, and would be repeated over time.

It should be noted, that while amplitude modulation of a sub-carrier by the ancillary data to be communicated has been described, other modulation formats that would provide orthogonal WaveIDs are possible. These formats include such formats as frequency or phase modulation of a sub-carrier, frequency or phase shift keying of a sub-carrier, code division multiple access (CDMA), frequency division multiple access (FDMA), and other formats known in the art. Furthermore, the intensity modulator 72 for modulating the optical data signal s1 at a SONET transceiver could be an optical attenuator or a circuit for controlling laser bias current of the transceiver. In addition, the WaveID is controlled to a target minimum modulation depth that both minimizes any undesirable effects that the modulation imposes on the optical data signal s1 and allows the WaveID to be reliably detected at optical multiplexed interfaces in the network.

In FIG. 3 there is illustrated in a block diagram the WaveID detection apparatus 48a of FIG. 1. The WaveID detection apparatus comprises a tap coupler 82, a PIN photo detector 84 coupled to the tap coupler 82 via an optical fiber 85, an electrical amplifier 86 connected to the PIN photo detector 84 via a link 87, a WaveID Detector 80 connected to the amplifier 86 via a link 89 and having input signals of sub-carrier frequencies f1 to fn. The network manager 100 is shown communicatively coupled to the WaveID detector 80 via a link 104. The modulated optical data signal s2 is input to the tap coupler 82 via an optical fiber 81, and the signal s1' is passed through the tap coupler 82 and output on an optical fiber 83. The input signals of sub-carrier frequencies f1 to fn are provided by the transceiver 46, where n is the maximum number of channels carried by a signal in the network; in this case n is thirty-three. The sub-carrier frequencies f1 to fn could range from f1=20 kHz to fn=660 kHz with an increment of 20 kHz between adjacent frequencies.

In operation, the modulated optical data signal s2 is input to the tap 10 coupler 82, and a portion s2' of the modulated optical data signal s2 is tapped and output on the fiber 85, while the remainder is output on the optical fiber 83. Typically, five percent of the optical power of the input signal is tapped by the tap coupler 82. The portion s2' is input to the PIN. photo detector 84 that converts the portion s2' to an electrical signal se2. This signal has a low power level and is typically noisy. However, because of the low data rate of each WaveID, which would generally be in the range of 1–10 bps, the data carried by each WaveID can be reliably received despite the noise present on the electrical signal se2. The electrical signal se2 is input to the amplifier 86 that outputs an amplified electrical signal se2'. This amplified electrical signal se2' is input to the WaveID detector 80, and the WaveIDs carried on sub-carrier frequency signals of frequencies f1 to fn are detected. This detection can be done in a number of ways that are known in the art. One technique would be to provide a high Q filter for each sub-carrier frequency signal, with each filter having a center frequency that is equal to the frequency of the respective sub-carrier frequency signal. The respective amplitude modulated WaveID could then be envelope detected at the output of each filter using a simple envelope detector. The data detected from each WaveID would be available to the NE equipped with the WaveID detection apparatus 48a and may be sent to the Network Manager 100 over the link 104. This data includes information that identifies the wavelength source of each channel, and therefore, the data can be used to determine the connectivity of the NE to the network.

It should be noted, that although the above discussed the detection of WaveIDs carried by amplitude modulated sub-carrier frequency signals, other techniques of WaveID detection are possible, and such techniques would need to be compatible with the WaveID modulation format used.

Examples of such formats were given earlier in connection with the WaveID insertion apparatus 28. A particularly flexible WaveID detector 80 would include a high speed analog to digital convertor (A/D) and a digital signal processor (DSP). This type of WaveID detector would have the flexibility of detecting different types of low bit rate WaveID modulation formats, and the detector would have enough processing power to decode in parallel the information contained in the WaveIDs.

The WaveIDs could be detected at any optical NE where there is a benefit in doing so. Examples include at the output of optical multiplexors and at the input of optical demultiplexors for determining the connectivity to the network of each, and at the input of optical amplifiers for associating a set of transmitters to a chain of optical amplifiers, which is useful in equalizing the optical power of the channels.

It should be noted that a WaveID is not limited to carrying only channel wavelength source and related information. Any ancillary data for which the bit rate of the WaveID is suitable could be carried over the WaveID.

Numerous modifications, variations, and adaptations may be made to the particular embodiments of the invention described above without departing from the scope of the invention, which is defined in the claims.

What is claimed is:

1. An apparatus for ancillary data in a wavelength division multiplexed system comprising:

a data source providing ancillary data associated with individual wavelength channels of a wavelength division multiplexed optical signal, and for each individual wavelength channel, a modulator for modulating a sub-carrier frequency signal with the ancillary data associated with the individual wavelength channel, and an intensity modulator for amplitude intensity modulating the respective individual wavelength channels with the modulated sub-carrier frequency signal carrying ancillary data associated with the individual wavelength channel;

the modulators providing a sub-carrier frequency signal for each individual wavelength channel which is orthogonal to other sub-carrier frequency signals; and a tap coupler for tapping a portion of the amplitude intensity modulated multiplexed optical signal;

an opto-electronic converter for converting the tapped portion of the optical signal to an electrical signal; and a detector for detecting the modulated sub-carrier frequency signals associated with individual wavelength channels from the electrical signal, and for detecting the ancillary data associated with individual wavelength channels from the modulated sub-carrier frequency signals.

2. An apparatus as claimed in claim 1, wherein the modulator is for modulating the sub-carrier frequency signal with the ancillary data at a bit rate that is at least eight orders of magnitude lower than the bit rate of the optical data signal.

3. An apparatus as claimed in claim 2, wherein the frequency of the sub-carrier frequency signal is less than the bit rate of the optical data signal divided by two.

4. An apparatus as claimed in claim 3, wherein the ancillary data includes channel source identification information.

5. An apparatus as claimed in claim 4, wherein the modulator is an amplitude modulator.

6. An apparatus as claimed in any of claims 1 to 5, wherein the ancillary data includes an Internet protocol address of the channel source.

7. An apparatus as claimed in any of claims 1 to 5, wherein the ancillary data includes a physical location identifier of the channel source.

8. An apparatus as claimed in any of claims 1 to 5, wherein the ancillary data includes a working or protection channel source identifier.

9. An apparatus as claimed in any of claims 1 to 5, wherein the ancillary data includes a payload format identifier.

10. An apparatus as claimed in any of claims 1 to 5, wherein the ancillary data includes a payload bit rate identifier.

11. An encoder for ancillary data in a wavelength division multiplexed system carrying an optical data signal comprising a plurality of wavelength channels, comprising:

a data source providing ancillary data associated with individual wavelength channels of a wavelength division multiplexed optical signal, and for each individual wavelength channel, a modulator for modulating a sub-carrier frequency signal with the ancillary data associated with an individual wavelength channel; and an intensity modulator for amplitude intensity modulating the respective individual wavelength channel with the modulated sub-carrier frequency signal, sub-carrier frequency signals for each wavelength channel being orthogonal.

12. An encoder as claimed in claim 11, wherein the modulator is for modulating the sub-carrier frequency signal with the ancillary data at a bit rate that is at least eight orders of magnitude lower than the bit rate of the optical data signal.

13. An encoder as claimed in claim 12, wherein the bit rate of the modulated sub-carrier frequency signal is less than the bit rate of the optical data signal divided by two.

14. An encoder as claimed in claim 13, wherein the ancillary data includes channel source identification information.

15. An encoder as claimed in claim 14, wherein the modulator is an amplitude modulator.

16. An encoder as claimed in any of claims 11 to 15, wherein the ancillary data includes an Internet protocol address of a channel wavelength source.

17. An encoder as claimed in any of claims 11 to 15, wherein the ancillary data includes a physical location identifier of a channel source.

18. An encoder as claimed in any of claims 11 to 15, wherein the ancillary data includes a working or protection channel source identifier.

19. An encoder as claimed in any of claims 11 to 15, wherein the ancillary data includes a payload format identifier.

20. An encoder as claimed in any of claims 11 to 15, wherein the ancillary data includes a payload bit rate identifier.

21. A decoder in a wavelength division multiplexed system for extracting ancillary data from an optical data signal comprising a plurality of wavelength channels, individual wavelength channels that have been amplitude intensity modulated by a modulated sub-carrier frequency signal that has been modulated by ancillary data associated with the individual wavelength channel, the set of sub-carrier frequency signals for different wavelength channels being orthogonal, comprising:

a tap coupler for tapping a portion of the modulated optical data signal;

an opto-electronic converter for converting the tapped portion to an electrical signal; and a detector for detecting the modulated sub-carrier frequency signals from the electrical signal, and for detecting the ancillary data associated with individual wavelength channels from the modulated sub-carrier frequency signals associated with the respective individual wavelength channels.

22. A decoder as claimed in claim 21, wherein the decoder is for extracting ancillary data that is provided at a bit rate that is at least eight orders of magnitude lower than the bit rate of the optical data signal.

23. A decoder as claimed in claim 22, wherein the bit rate of the modulated sub-carrier frequency signal is less than the bit rate of the optical data signal divided by two.

24. A decoder as claimed in claim 23, wherein the ancillary data includes channel source identification information.

25. A decoder as claimed in claim 24, wherein the detector is for detecting the ancillary data from an amplitude modulated sub-carrier frequency signal.

26. A decoder as claimed in any of claims 21 to 25, wherein the ancillary data includes an Internet protocol address of a channel source.

27. A decoder as claimed in any of claims 21 to 25, wherein the ancillary data includes a physical location identifier of a channel source.

28. A decoder as claimed in any of claims 21 to 25, wherein the ancillary data includes a working or protection channel source identifier.

29. A decoder as claimed in any of claims 21 to 25, wherein the ancillary data includes a payload format identifier.

30. A decoder as claimed in any of claims 21 to 25, wherein the ancillary data includes a payload bit rate identifier.

31. A method of communicating ancillary data in a wavelength division multiplexed system comprising the steps of:

at a first node in the system, for individual wavelength channels of an optical data signal a) modulating a sub-carrier frequency signal with the ancillary data;

b) amplitude intensity modulating a respective individual wavelength channel of the optical data signal with the modulated sub-carrier frequency signal;

the modulated sub-carrier frequency signals for each wavelength channel being orthogonal c) transmitting the modulated optical data signal onto an optical fiber; and at a second node in the system d) tapping a portion of the modulated optical data signal from the optical fiber;

e) converting the tapped portion to an electrical signal;

f) detecting the modulated sub-carrier frequency signals from the electrical signal; and g) detecting the ancillary data from the modulated sub-carrier frequency signal associated with each respective individual wavelength channel.

32. A method as claimed in claim 31, wherein the step a) of modulating the sub-carrier frequency signal with the ancillary data is performed at a bit rate that is at least eight orders of magnitude lower than the bit rate of the optical data signal.

33. A method as claimed in claim 32, wherein the step a) of modulating the sub-carrier frequency signal is performed on an electrical signal that has a frequency that is less than the bit rate of the optical data signal divided by two.

34. A method as claimed in claim, 33, wherein the ancillary data; includes channel; source identification information!.

35. A method as claimed in claim 34, wherein the step a) of modulating, the sub-carrier frequency signal is performed by amplitude modulation.

36. A method as claimed in any of claims 31 to 35, wherein the ancillary data includes an Internet protocol address of a channel source.

37. A method as claimed in any of claims 31 to 35, wherein the ancillary data includes a physical location identifier of a channel source.

38. A method as claimed in any of claims 31 to 35, wherein the ancillary data includes a working or protection channel source identifier.

39. A method as claimed in any of claims 31 to 35, wherein the ancillary data includes a payload format identifier.

40. A method as claimed in any of claims 31 to 35, wherein the ancillary data includes a payload bit rate identifier.

41. An apparatus for ancillary data in a wavelength division multiplexed system comprising:
   a data source for providing the ancillary data wherein the ancillary data includes channel source identifying information; and
   means for inserting on a wavelength channel the respective ancillary data associated with the individual wavelength channel of the optical data signal, wherein the individual wavelength channel of the optical data signal is amplitude intensity modulated by a sub-carrier signal that has been modulated by the respective ancillary data, the sub-carrier signal associated with the individual wavelength channel being orthogonal to sub-carrier signals on other wavelength channels.

42. A method of communicating ancillary data in a wavelength division multiplexing system carrying an optical data signal comprising a plurality of wavelength channels, comprising the steps of:
   at a first node,
   providing a set of sub-carrier frequency signals, each sub-carrier frequency signal carrying ancillary data associated with a respective one of the wavelength channels, the set of sub-carrier frequency signals being orthogonal;
   inserting each respective sub-carrier frequency signal on the associated wavelength channel of the optical data signal, and
   transmitting the modulated optical data signal, and
   at a second node,
   tapping the modulated optical data signal,
   recovering the set of sub-carrier frequency signals from the optical data signals,
   detecting the ancillary data from the modulated sub-carrier frequency signals associated with each respective wavelength channel.

43. A method as claimed in claim 42, wherein the step of inserting the sub-carrier frequency signal with the ancillary data is performed at a bit rate that is at least eight orders of magnitude lower than the bit rate of the optical data signal.

44. A method as claimed in claim 42 wherein the step of inserting the sub-carrier frequency signal is performed on an electrical signal that has a frequency that is less than the bit rate of the optical data signal divided by two.

45. A method as claimed in claim 42 wherein the ancillary data includes channel source identification information.

46. A method as claimed in claim 42, wherein the step of inserting the sub-carrier frequency signal is performed by amplitude modulation.

47. A method as claimed in claim 42, wherein the ancillary data includes an Internet protocol address of a channel source.

48. A method as claimed in claim 42, wherein the ancillary data includes a physical location identifier of a channel source.

49. A method as claimed in claim 42, wherein the ancillary data includes a working or protection channel source identifier.

50. A method as claimed in claim 42, wherein the ancillary data includes a payload format identifier.

51. A method as claimed in claim 42, wherein the ancillary data includes a payload bit rate identifier.

52. An apparatus for communicating ancillary data in a wavelength division multiplexing system carrying an optical data signal comprising a plurality of wavelength channels, comprising:
   at a first node,
   an input providing a set of sub-carrier frequency signals, each sub-carrier frequency signal carrying ancillary data associated with a respective one of the wavelength channels, the set of sub-carrier frequency signals being orthogonal;
   a modulator for inserting each respective sub-carrier frequency signal on the associated wavelength channel of the optical data signal, and
   at a second node,
   a tap for tapping a portion of the modulated optical data signal, and
   a detector for detecting the set of sub-carrier frequency signals from the optical data signals and for detecting ancillary data from the modulated sub-carrier frequency signals associated with each respective wavelength channel.

53. A method of communicating ancillary data in a wavelength division multiplexing system carrying an optical data signal comprising a plurality of wavelength channels, comprising the steps of:
   at a first node,
   providing a set of sub-carrier frequency signals, each sub-carrier frequency signal carrying ancillary data associated with a respective one of the wavelength channels, the set of sub-carrier frequency signals being orthogonal;
   inserting each respective sub-carrier frequency signal on the associated wavelength channel of the optical data signal, and
   transmitting the modulated optical data signal, and
   at a second node,
   tapping a portion of the modulated optical data signal,
   recovering the set of sub-carrier frequency signals from the optical data signals, detecting from the sub-carrier frequency signals the ancillary data associated with each respective wavelength channel.

54. A apparatus for communicating ancillary data in a wavelength division multiplexing system carrying an optical data signal comprising a plurality of wavelength channels, comprising:

at a first node, a source of ancillary data associated with individual wavelength channels, an encoder for modulating a set of sub-carrier frequency signals associated with individual wavelength channels with respective ancillary data associated with the individual wavelength channel, the set of sub-carrier frequency signals being orthogonal;

insertion means for inserting a respective modulated sub-carrier frequency signal on the associated wavelength channel of the optical data signal, and at a second node, a tap coupler for tapping a portion of the modulated optical data signal, a decoder for recovering the set of modulated sub-carrier frequency signals from the optical data signals, and detecting from the modulated sub-carrier frequency signals the ancillary data associated with each respective wavelength channel.

\* \* \* \* \*